(12) United States Patent
Cudak et al.

(10) Patent No.: US 9,031,732 B1
(45) Date of Patent: May 12, 2015

(54) SECONDARY SOURCES OF NAVIGATION DATA FOR IMPROVED CONTROL OF AN AUTOMONOUS VEHICLE

(71) Applicant: International Business Machines Corporation, Armonk, NY (US)

(72) Inventors: Gary D. Cudak, Creedmoor, NC (US); Christopher J. Hardee, Raleigh, NC (US); Adrian X. Rodriguez, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/106,928

(22) Filed: Dec. 16, 2013

Related U.S. Application Data

(63) Continuation of application No. 14/106,128, filed on Dec. 13, 2013.

(51) Int. Cl.
*G01C 21/26* (2006.01)
*G01D 1/02* (2006.01)
*G05D 1/02* (2006.01)

(52) U.S. Cl.
CPC ............... *G01C 21/26* (2013.01); *G05D 1/021* (2013.01)

(58) Field of Classification Search
USPC .......................................................... 701/23
See application file for complete search history.

(56) References Cited

U.S. PATENT DOCUMENTS

| | | | |
|---|---|---|---|
| 6,768,942 B1 * | 7/2004 | Chojnacki | 701/532 |
| 7,469,827 B2 | 12/2008 | Katragadda et al. | |
| 7,688,222 B2 * | 3/2010 | Peddie et al. | 340/905 |
| 8,078,349 B1 | 12/2011 | Prada Gomez et al. | |
| 8,185,254 B2 | 5/2012 | Brinkman | |
| 8,259,994 B1 | 9/2012 | Anguelov et al. | |
| 8,321,067 B1 | 11/2012 | Prada Gomez et al. | |
| 8,437,501 B1 | 5/2013 | Anguelov et al. | |
| 8,457,827 B1 | 6/2013 | Ferguson et al. | |
| 8,463,546 B2 * | 6/2013 | Rolinski et al. | 701/533 |
| 8,473,144 B1 | 6/2013 | Dolgov et al. | |
| 8,493,198 B1 | 7/2013 | Vasquez et al. | |
| 8,521,352 B1 * | 8/2013 | Ferguson et al. | 701/25 |

(Continued)

FOREIGN PATENT DOCUMENTS

| | | |
|---|---|---|
| JP | 2006064705 A | 3/2006 |
| WO | WO9305492 A1 | 3/1993 |
| WO | WO2012047743 A2 | 4/2012 |

OTHER PUBLICATIONS

Fujitsu Ltd, "System and Method for Map Display" JP2006064705A English Abstract, Mar. 9, 2006, 25 pages.

*Primary Examiner* — Mary Cheung
*Assistant Examiner* — Anne Mazzara
(74) *Attorney, Agent, or Firm* — Katherine S. Brown; Jeffrey L. Streets

(57) ABSTRACT

A method comprises controlling the operation of an autonomous vehicle using navigation data from a first data source until the autonomous vehicle reaches a specific area for which a second data source has navigation data for the specific area, and using navigation data from the second data source to control operation of the autonomous vehicle while the autonomous vehicle is within the specific area. Non-limiting examples of a specific area include construction zones, private property, secure areas, and state parks. When the autonomous vehicle reaches these specific areas, navigation data specific to this area may be downloaded from a second data source.

20 Claims, 4 Drawing Sheets

(56) References Cited

U.S. PATENT DOCUMENTS

| | | |
|---|---|---|
| 8,527,146 B1 | 9/2013 | Jackson et al. |
| 8,692,688 B1 * | 4/2014 | Tuxen .................... 340/932.2 |
| 2006/0253226 A1 * | 11/2006 | Mendelson ................ 701/1 |
| 2010/0121567 A1 | 5/2010 | Mendelson |
| 2011/0153190 A1 * | 6/2011 | Rolinski et al. ............ 701/201 |
| 2014/0032034 A1 * | 1/2014 | Raptopoulos et al. ...... 701/25 |
| 2014/0266585 A1 * | 9/2014 | Chao et al. ................ 340/5.61 |

* cited by examiner

SECONDARY SOURCES OF NAVIGATION DATA FOR IMPROVED CONTROL OF AN AUTOMONOUS VEHICLE

CROSS-REFERENCE TO RELATED APPLICATIONS

This application is a continuation of U.S. patent application Ser. No. 14/106,128 filed on Dec. 13, 2013, which application is incorporated by reference herein.

BACKGROUND

1. Field of the Invention

The present invention relates to the control and operation of an autonomous vehicle.

2. Background of the Related Art

An autonomous vehicle is a vehicle that is capable of navigating roadways without a person controlling the vehicle. The autonomous vehicle may use a variety of sensors, data and processing capacity in order to navigate to a destination, avoid hazards and obey traffic signs. Examples of sensors used by an autonomous vehicle include global positioning system (GPS) receivers, cameras, radar and lidar.

Autonomous cars are now in existence and have logged hundreds of thousands of mile on public roads. Several states, such as Texas and California, have passed laws that allow use of autonomous vehicles. While the basic technology has been largely proven and laws now permit use of such vehicles on public roads, autonomous vehicles are not yet in widespread distribution and use.

BRIEF SUMMARY

One embodiment of the present invention provides a method comprising controlling the operation of an autonomous vehicle using navigation data from a first data source until the autonomous vehicle reaches a specific area for which a second data source has navigation data for the specific area, and using navigation data from the second data source to control operation of the autonomous vehicle while the autonomous vehicle is within the specific area.

DETAILED DESCRIPTION

Figure 1:
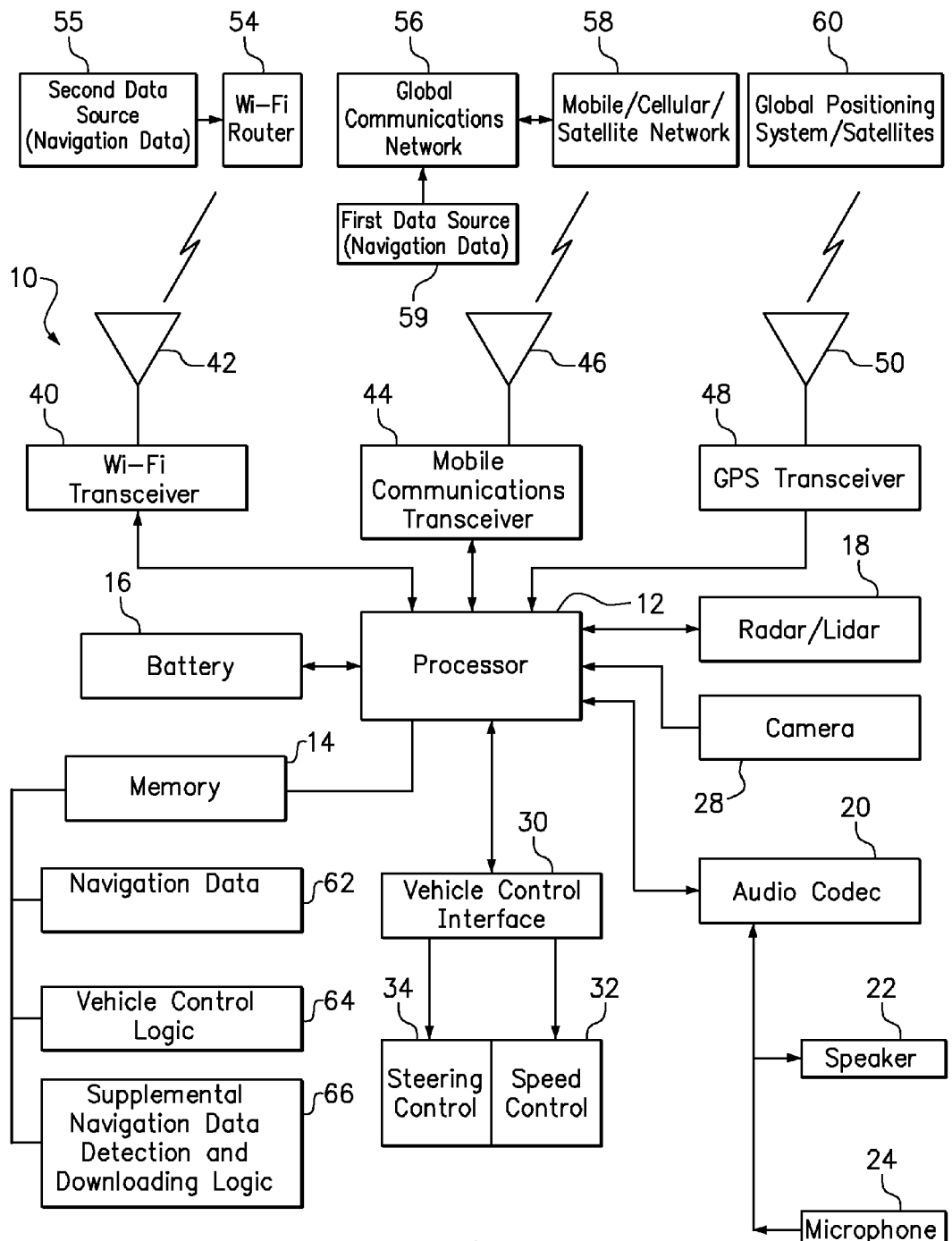
FIG. 1 is a diagram of a computer system controlling an autonomous vehicle.

One embodiment of the present invention provides a method comprising controlling the operation of an autonomous vehicle using navigation data from a first data source until the autonomous vehicle reaches a specific area for which a second data source has navigation data for the specific area, and using navigation data from the second data source to control operation of the autonomous vehicle while the autonomous vehicle is within the specific area.

The operation of the autonomous vehicle may include various controls, features, and modes, and may utilize data from various types and positions of sensors. However, the autonomous vehicle may also use navigation data to help guide the vehicle along a roadway from a starting point to a destination. Such navigation data may be obtained from a first data source, such as memory of a control system on board the autonomous vehicle, or perhaps downloaded via satellite on a periodic basis. However, navigation of the autonomous vehicle may be improved using navigation data from a second data source to control operation of the autonomous vehicle while the autonomous vehicle is within a specific area. The second data source provides specialized navigation data that is specifically tailored to the routes and conditions within the specific area. Non-limiting examples of these specific areas includes construction zones, private property, secure areas, and state parks. When the autonomous vehicle reaches these specific areas, navigation data specific to this area may be obtain from a second data source.

In some instances, the first data source may have no navigation data for the specific area. In other instances, the second data source has navigation data for the specific area that is more current than the first data source, more detailed than the first data source, or both more current and more detailed than the first data source. For example, a construction zone may re-route traffic on a weekly basis until the construction is completed and the navigation data from the first data source may be out of date and obsolete. Rather, a second data source may provide navigation data that is updated as the construction proceeds and roadway modification are made within the construction zone. Optionally, the navigation data from the second data source may include data for both route and speed.

In another instance, the first data source may have navigation data that covers the specific area, but not at a level of detail necessary for optimal operation through the specific area. For example, a state park may have winding roads that following the edge of a river or lake, and various conditions may dictate modifications of a roadway or the manner in which a vehicle should drive through the park. More specifically, the winding roads may benefit from a higher level of detail than many other roadways, and it may not be practical to store the higher level of detail in memory of the autonomous vehicle without any reason to believe that the autonomous vehicle will ever enter the state park. Optionally, the second data source has navigation data for the specific area that includes more than twice as much detail about the roadway through the specific area. When an autonomous vehicle approaches or enters the state park, the second data source can provide the relevant navigation data. Furthermore, the navigation data from the second data source may include instructions for the autonomous vehicle to take various other actions including: (1) altering some functions in vehicle, such as disabling an anti-lock braking system (ABS) if the terrain dictates, or disable a camera in a secure area; (2) altering some aspect of the control scheme, such as changing how the control system will prioritize the information received from various sensors; (3) requesting more frequent updates of navigation data or roadway conditions from other vehicles within the same area in order to anticipate or time movement better; or (4) combinations thereof.

Embodiments of the present invention are beneficially used where the specific area is a roadway on property owned by a private entity and wherein the navigation data from the second data source is maintained and provided by the private entity. Since the area is private property, the owner controls the route of any roadway and may also control the navigation data describing the roadway. Optionally, the private entity that owns the specific area may prevent an unauthorized autonomous vehicle from accessing the navigation data from the second data source. Furthermore, security measures may require that the navigation data alter the use of one or more sensors used to guide the autonomous vehicle, such as preventing the use of a camera in a high security area.

In a further embodiment, the method may further comprise tracking the effectiveness of the navigation data used by the autonomous vehicle, and updating the navigation data with data collected by the sensors of the autonomous vehicle. While the navigation data provides a general route to follow, the autonomous vehicle will typically make minor modifications to stay within a lane, avoid an obstacle, and the like. Where the actual route traversed by the autonomous vehicle differs from the navigation data or map, the navigation data may be updated. The effectiveness of navigation data may, for instance, be represented by an accident rate for a particular area, or perhaps a rate at which the autonomous vehicle must ignore navigation data and rely completely on a sensor controlled mode.

In various embodiments, the autonomous vehicle may use various means to detect that navigation data is available from the second data source. For example, the first data source may identify and locate the specific area and indicate that navigation data from the second data source is available for the specific area. In another example, the autonomous vehicle may detect that a wireless transceiver is located within the area and can communicate navigation data from the second data source to the autonomous vehicle. Still further, the autonomous vehicle may observe a physical sign along a roadway, preferably prior to entering the specific area, indicating that navigation data is available from the second data source. Such a physical sign may be written in words, or perhaps using a code such as a two-dimensional matrix bar code. Optionally, the autonomous vehicle may automatically download navigation data from the second data source in response to detecting the wireless points or crossing a boundary at or near the specific area according to GPS coordinates.

Embodiments of the present invention enable downloading navigation data from the second data source to the autonomous vehicle. In one option, the autonomous vehicle may save the navigation data downloaded from the second data source into non-volatile memory so that the data may be reused as needed. However, various factors may be considered in determining whether or not to store the navigation data downloaded from the second data source. For example, if the autonomous vehicle travels through the specific area frequently or if there was difficulty (such as latency) in downloading the navigation data from the second data source, then the data is preferably stored. In a specific embodiment, the method retains a stored copy of the navigation data from the second data source after leaving the area in response to a stored travel log indicating that the autonomous vehicle travels to the area more often than a set point frequency.

However, if the navigation data from the second data source is frequently updated or if the autonomous vehicle has a limited amount of memory for storage of specialized navigation data, then this may weigh in favor of deleting the data. In one embodiment, the method includes the autonomous vehicle saving the navigation data downloaded from the second data source into a memory designated for temporary navigation data, and then deleting the navigation data from the memory in response to leaving the specific area. Furthermore, the navigation data may be incrementally deleted after each step or instruction has been executed. The latter approach to incremental deletion may be favored in a high security area.

In a still further embodiment, downloading of the navigation data from the second data source to the autonomous vehicle includes downloading navigation data that is identified for use by an autonomous vehicle having a particular characteristic, wherein the characteristic is selected from vehicle type, vehicle size, vehicle performance, and combinations thereof. This embodiment allows for the navigation data to be tailored or customized for a characteristic of the vehicle. For example, if an autonomous vehicle identified itself, or was independently identified, as a large truck, then the second data source may provide a version of the navigation data that is specifically intended for a large truck. In another example, a specialized version of the navigation data may be downloaded based upon the availability, quality and placement of sensors that the autonomous vehicle uses for decision making.

Furthermore, if the autonomous vehicle is able to communicate its function or purpose, such as dropping off an outbound traveler at the airport, then the navigation data provided to the autonomous vehicle upon approaching the airport may be a version that specifically details the drop off ("Departures") lanes and zones, rather than the pickup ("Arrivals") lanes and zones.

One embodiment of the present invention provides a computer program product including computer readable program code embodied on a computer readable storage medium. The computer program product comprises computer readable program code for controlling the operation of an autonomous vehicle using navigation data from a first data source until the autonomous vehicle reaches a specific area for which a second data source has navigation data for the specific area, and computer readable program code for using navigation data from the second data source to control operation of the autonomous vehicle while the autonomous vehicle is within the specific area.

The foregoing computer program product may further include computer readable program code for implementing or initiating any one or more aspects of the methods described herein. Accordingly, a separate description of the methods will not be duplicated in the context of a computer program product.

FIG. 1 is a diagram of a computer system 10 controlling an autonomous vehicle. The system 10 may include a processor 12, memory 14, a DC power source or battery 16, a Radar or Lidar unit 18, one or more cameras 28, and an audio codec 20 coupled to a speaker 22 and a microphone 24. The computer system 10 further includes a vehicle control interface 30 which provides signals to a steering controller 32 and a speed controller 34. Other components may also be included.

The system 10 may also include a Wi-Fi transceiver 40 and corresponding antenna 42 allowing the system to communicate with a Wi-Fi router 54, a mobile communications transceiver 44 and corresponding antenna 46 allowing the system to communicate over a mobile/cellular/satellite network 58, and a global positioning system (GPS) transceiver 48 and corresponding antenna 50 allowing the system to obtain signals from a global positioning system or satellites 60. In a non-limiting example, the mobile/cellular/satellite network 58 may be connected to a global communications network 56, such as the Internet. Accordingly, the mobile/cellular/satellite network 58 may include or access a first data source 59, such as a server, for the purpose of obtaining navigation data. As shown, the memory 14 stores navigation data 62, vehicle control logic 64, and supplemental navigation data detection and downloading logic 66. In accordance with one embodiment of the present invention, the supplemental navigation data detection and downloading logic 66 may be used to detect a Wi-Fi router 54 upon reaching a specific area, where the Wi-Fi router 54 is in communication with a second data source 55 of navigation data for the specific area.

Figure 2:
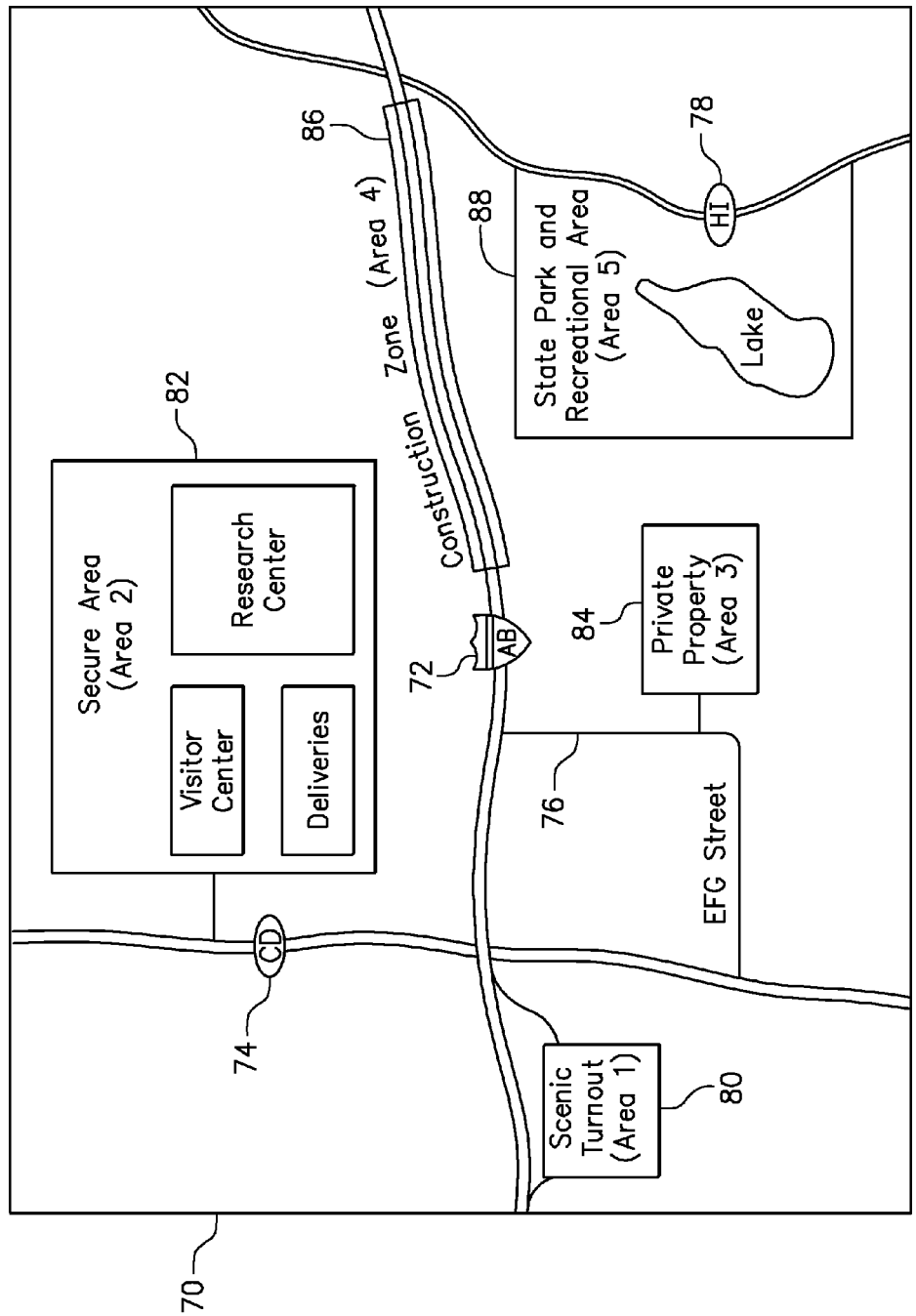
FIG. 2 is a diagram of a map showing various areas where navigation data may be obtained from a second data source.

FIG. 2 is a diagram of a map (navigation data) 70 showing various areas (Area 1 through Area 5) where navigation data may be obtained from a second data source. In this non-limiting example, an interstate highway AB 72 extends across the map intersecting with highway CD 74, EFG Street 76 and highway HI 78. A first data source provides an autonomous vehicle with the navigation data for the roadways 72, 74, 76, 78 and identifies the existence of a Scenic Turnout (Area 1) 80, a Secure Area (Area 2) 82, Private Property (Area 3) 84, a Construction Zone (Area 4) 86, and a State Park and Recreational Area (Area 5) 88. Note that while the navigation data or map 70 from the first data source identifies the specific areas 80, 82, 84, 86, 88 and indicates that specialized navigation data may be obtained for these areas. As previously discussed, the reason for the specialized or supplemental navigation data may differ from one area to the next. For example, navigation data associated with the private property (Area 3) 84 is controlled by a private entity, navigation data associated with the secure area (Area 2) 82 has limited access, navigation data associated with the scenic turnout (Area 1) 80 and state park (Area 5) may provide more detailed data and perhaps alternative data versions for different types of vehicles, and the construction zone (Area 4) 86 may provide current data regarding frequently changing detours and obstacles.

Figure 3:
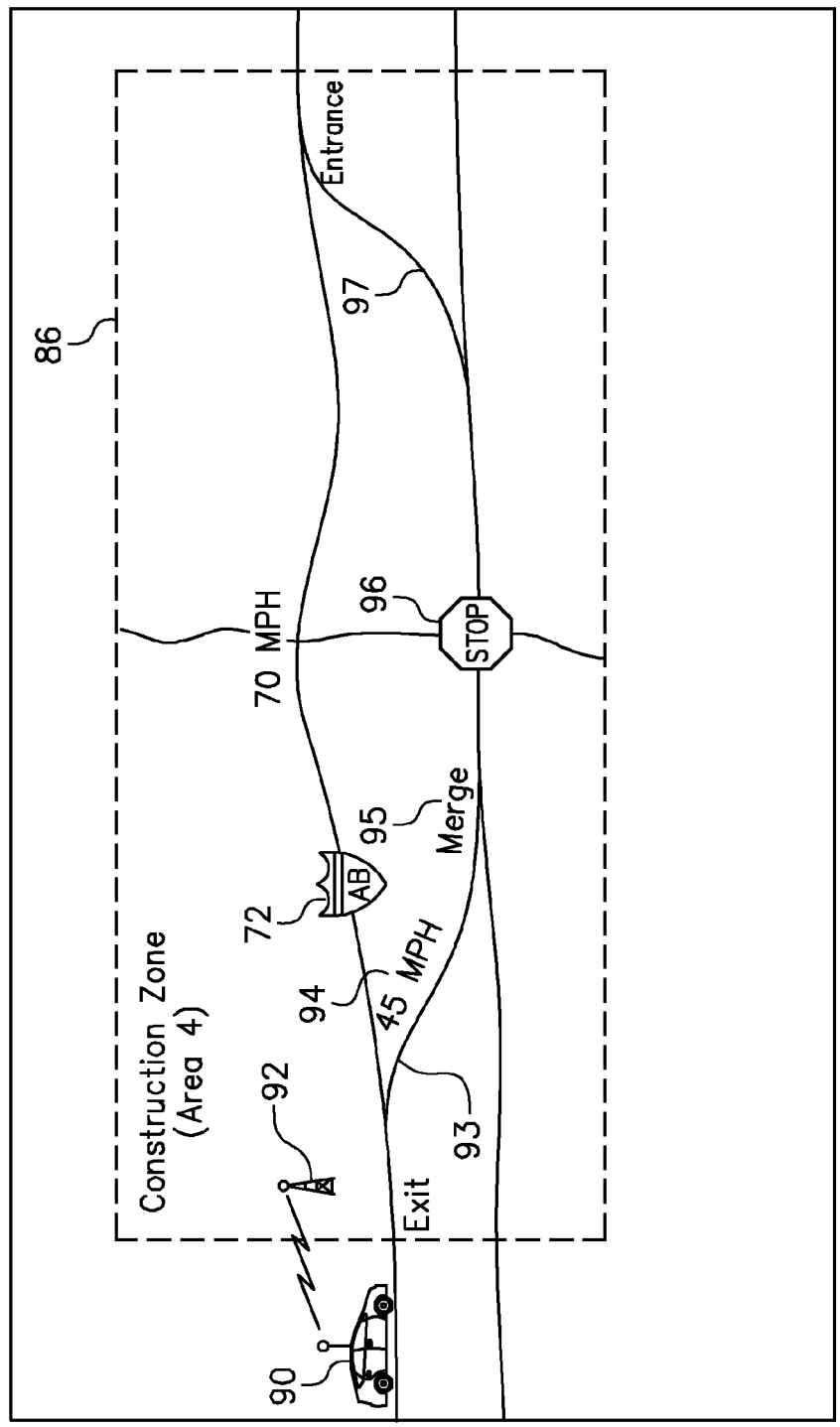
FIG. 3 is a diagram of an autonomous vehicle approaching a specific area where navigation data may be obtained from a second data source.

FIG. 3 is a diagram of an autonomous vehicle 90 approaching a specific area where navigation data may be obtained from a second data source. In particular, the autonomous vehicle 90 has reached the construction zone (Area 4) 86 of FIG. 2. The autonomous vehicle 90 has detected the wireless point 92 and is downloading the navigation data that is specific to the construction zone 86. While the navigation data from the first source of data (See navigation data 70 in FIG. 2) shows the interstate highway AB 72, the more detailed navigation data for the construction zone 86 includes a description of the exit ramp 93, a reduced speed limit 94 of 45 miles per hour (MPH), the merge with a feeder road 95, a stop sign 96 at an intersection with another road, and an entrance ramp returning traffic to the interstate highway 72. The navigation data from the first data source only described the route and speed of the interstate highway 72 and identified that there was a construction area 86. The navigation data from the wireless router or point 92 provides a current description of the detour and is kept up to date to reflect frequent changes.

Figure 4:
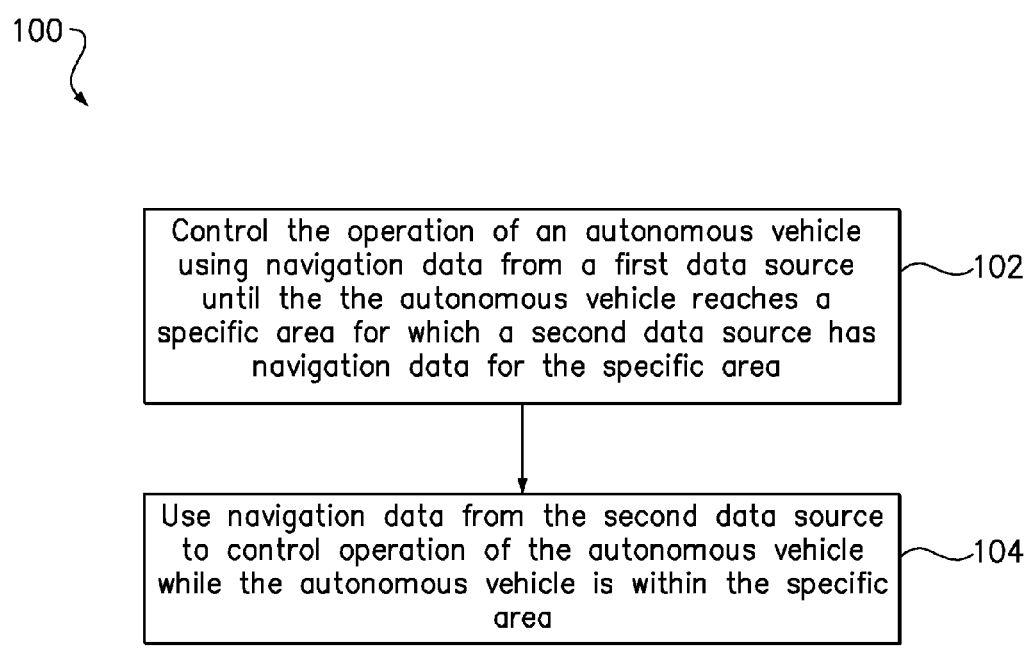
FIG. 4 is a flowchart of a method for controlling an autonomous vehicle in accordance with one embodiment of the present invention.

FIG. 4 is a flowchart of a method 100 for controlling an autonomous vehicle in accordance with one embodiment of the present invention. In step 102, the method controls the operation of an autonomous vehicle using navigation data from a first data source until the autonomous vehicle reaches a specific area for which a second data source has navigation data for the specific area. In step 104, the method uses navigation data from the second data source to control operation of the autonomous vehicle while the autonomous vehicle is within the specific area.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
controlling the operation of an autonomous vehicle using navigation data from a first data source until the autonomous vehicle reaches a specific area for which a second data source has navigation data for the specific area; and
using navigation data from the second data source to control operation of the autonomous vehicle while the autonomous vehicle is within the specific area.

2. The method of claim 1, wherein the first data source has no navigation data for the specific area.

3. The method of claim 1, wherein the first data source has navigation data for the specific area, and wherein the second data source has navigation data for the specific area that is more current than the navigation data for the specific area from the first data source, more detailed than the navigation data for the specific area from the first data source, or both more current and more detailed than the navigation data for the specific area from the first data source.

4. The method of claim 3, wherein the second data source has navigation data for the specific area that includes more than twice as much detail about the roadway through the specific area as the navigation data for the specific area from the first data source.

5. The method of claim 1, wherein the navigation data from the second data source includes both route and speed data.

6. The method of claim 1, wherein the navigation data alters the use of one or more sensors of the autonomous vehicle that are used to guide the autonomous vehicle.

7. The method of claim 1, wherein the specific area is a roadway construction zone, the method further comprising:
updating the navigation data available from the second data source in response to roadway modifications within the construction zone.

8. The method of claim 1, wherein the specific area is a roadway on property owned by a private entity and wherein the navigation data from the second data source is maintained and provided by the private entity.

9. The method of claim 8, further comprising:
preventing the navigation data from the second data source from being accessed by autonomous vehicles that are unauthorized by the private entity.

10. The method of claim 1, further comprising:
tracking the effectiveness of the navigation data used by the autonomous vehicle; and
updating the navigation data with data collected by the sensors of the autonomous vehicle.

11. The method of claim 1, wherein the first data source identifies and locates the specific area and indicates that navigation data from the second data source is available for the specific area.

12. The method of claim 1, further comprising:
the autonomous vehicle detecting that navigation data is available from the second data source.

13. The method of claim 1, further comprising:
the autonomous vehicle detecting a wireless transceiver within the area to communicate the navigation data from the second data source to the autonomous vehicle.

14. The method of claim 1, further comprising:
the autonomous vehicle observing a physical sign along a roadway prior to entering the area indicating that navigation data is available from the second data source.

15. The method of claim 1, further comprising:
downloading the navigation data from the second data source to the autonomous vehicle.

16. The method of claim 15, further comprising:
the autonomous vehicle saving the navigation data downloaded from the second data source into non-volatile memory.

17. The method of claim 15, further comprising:
the autonomous vehicle saving the navigation data downloaded from the second data source into a memory designated for temporary navigation data; and
deleting the navigation data from the memory in response to leaving the specific area.

18. The method of claim 1, further comprising:
automatically downloading the navigation data from the second data source to the autonomous vehicle in response to reaching the specified area as identified by the navigation data from the first data source, detecting a wireless transceiver within the area indicating that navigation data is available from the second data source, or observing a physical sign along a roadway indicating that navigation data is available from the second data source.

19. The method of claim 1, further comprising:
retaining a stored copy of the navigation data from the second data source after leaving the area in response to a stored travel log indicating that the autonomous vehicle travels to the area more than a setpoint frequency.

20. The method of claim 1, wherein downloading the navigation data from the second data source to the autonomous vehicle includes downloading navigation data that is identified for use by a particular characteristic of the autonomous vehicle, wherein the characteristic is selected from vehicle type, vehicle size, vehicle performance, and combinations thereof.

* * * * *